C. K. MELLINGER,

Assignor to S. G FLAGG & J. W. ANDERSON.

Shifting Seat for Carriages.

No. 9,520. Reissued Dec. 28, 1880.

WITNESSES:

James F. Tobin.

Henry Howson Jr.

INVENTOR:

Christian K. Mellinger by his Attorneys.

Howson and Son

N. PETERS, PHOTO-LITHOGRAPHER, WASHINGTON, D. C.

UNITED STATES PATENT OFFICE.

CHRISTIAN K. MELLINGER, OF PHILADELPHIA, ASSIGNOR TO STANLEY G. FLAGG, OF SAME PLACE, AND JOHN W. ANDERSON, OF LANCASTER, PENNSYLVANIA.

SHIFTING SEAT FOR CARRIAGES.

SPECIFICATION forming part of Reissued Letters Patent No. 9,520, dated December 28, 1880.

Original No. 59,920, dated November 20, 1866. Application for reissue filed October 21, 1880.

*To all whom it may concern:*

Be it known that I, CHRISTIAN K. MELLINGER, formerly of Manor township, in the county of Lancaster, Pennsylvania, but now residing in Philadelphia, in the same State, have invented certain Improvements in Shifting Seats for Carriages; and I do hereby declare the following to be a full, clear, and exact description of the same.

The object of my invention is to make a shifting carriage-seat which can be readily applied to a carriage without any other preparation than that of securing certain frames, described hereinafter, to the floor or side beams of the carriage, the seat admitting being adjusted to two positions and being self-retaining in each, as fully explained hereinafter.

Figure 1:
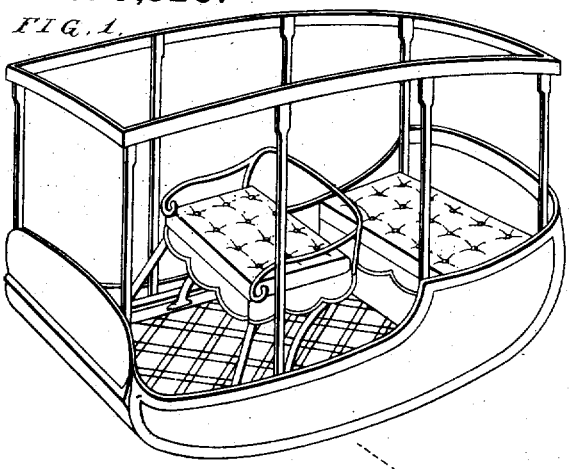
Figure 2:
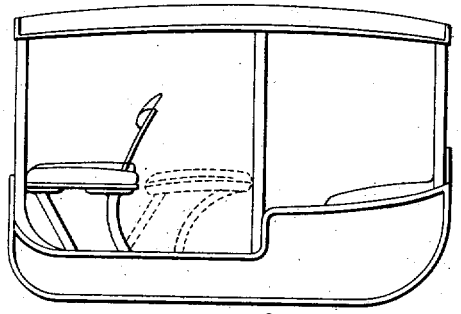
Figure 2:
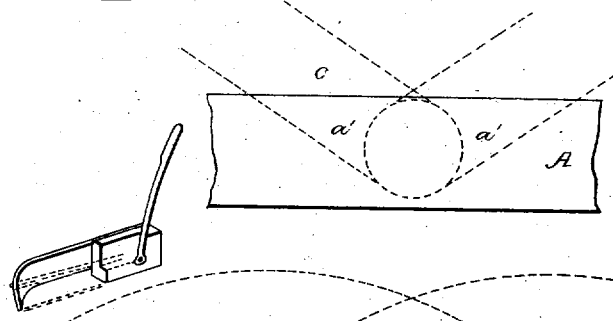
Figure 4:
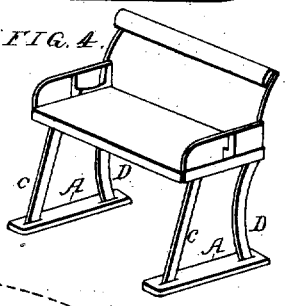
Figure 3:
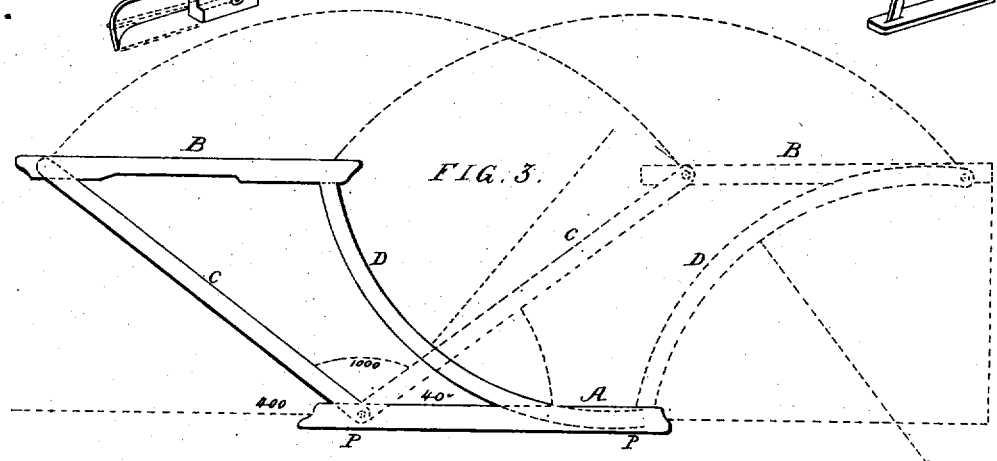
Figure 3:
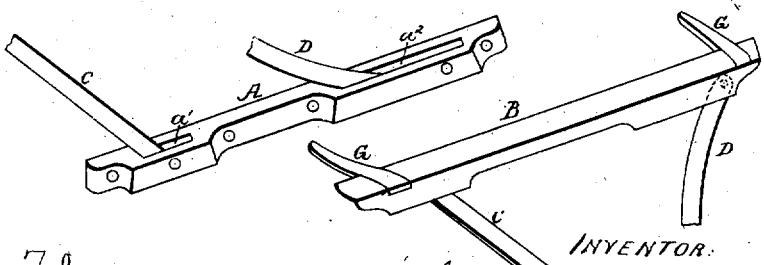

In the accompanying drawings, Figure 1 is a perspective view of a carriage with my improved shifting seat; Fig. 2, a side view of a three-posted carriage, showing the seat in its forward position and by dotted lines in its rearward position; Fig. 3, diagrams illustrating the construction and operation of one of the frames of the seat, and Fig. 4 the seat provided with a drop buggy-back.

The seat-board is supported by two frames, each of which consists of the top bar, B, the two braces or legs C and D, and the base-bar A, the said legs being pivoted both to the base and top bars, so that the frame is adjustable to the position shown by plain lines, or that indicated by dotted lines in Fig. 3, stops combined with the frame serving to render the same self-retaining in either of these positions. The base-bar has slots *a a'* for the reception of the lower ends of the legs, and the ends of these slots serve as the stops when the frame has reached either of the two positions shown in Fig. 3. Each frame may be made of wrought or cast iron, or of wood, provided it is substantial enough.

The brace D may be more or less curved, so as to give room for the knees of the occupant of the back seat of the carriage.

The top bar, B, of each frame may be provided with inwardly-projecting extensions G G, which serve as additional supports to the seat.

It will be seen that the seat, consisting of the seat-board and its two frames, is a self-contained device—that is to say, it possesses within itself provisions for retaining the seat-board in either of the two positions shown, and does not depend upon any part of the carriage for such retention. The seat can therefore be applied to the carriage at once, without any other preparation than that of securing the base-bars of the frames to the floor of the carriage or to the side bars of the same.

I claim as my invention—

1. A carriage-seat frame in which braces or legs C D are combined with bars A B, pivoted to the said braces, and with stops, which constitute part of the frame, and which restrict the movement of the braces and upper bar, all substantially as set forth.

2. A carriage-seat in which are combined the following elements, namely: a seat-board and two self-contained frames, each consisting of two braces and two bars pivoted thereto, and having stops for restricting the movement of the seat, all substantially as set forth.

3. The combination of the upper bar, B, and the braces C and D, pivoted thereto, with the lower bar, A, also pivoted to the said braces, and having slots *a a'* of such length and shape as to restrict the movement of the braces, substantially as set forth.

In testimony whereof I have signed my name to this specification in the presence of two subscribing witnesses.

C. K. MELLINGER.

Witnesses:

JAMES F. TOBIN,

HARRY SMITH.